(12) United States Patent
Kominami et al.

(10) Patent No.: US 11,046,145 B2
(45) Date of Patent: Jun. 29, 2021

(54) AIR CONDITIONING DAMPER, AND AIR CONDITIONING DEVICE FOR VEHICLE

(71) Applicant: MITSUBISHI HEAVY INDUSTRIES THERMAL SYSTEMS, LTD., Tokyo (JP)

(72) Inventors: Satoshi Kominami, Tokyo (JP);
Takahide Yamamoto, Tokyo (JP);
Tsubasa Yamashita, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 130 days.

(21) Appl. No.: 16/465,861

(22) PCT Filed: Dec. 6, 2017

(86) PCT No.: PCT/JP2017/043835
§ 371 (c)(1),
(2) Date: May 31, 2019

(87) PCT Pub. No.: WO2018/105660
PCT Pub. Date: Jun. 14, 2018

(65) Prior Publication Data
US 2019/0299742 A1    Oct. 3, 2019

(30) Foreign Application Priority Data
Dec. 8, 2016  (JP) .............................. JP2016-238612

(51) Int. Cl.
*B60H 1/00*    (2006.01)
*F24F 13/14*    (2006.01)
(Continued)

(52) U.S. Cl.
CPC ........... *B60H 1/00678* (2013.01); *B60H 1/00* (2013.01); *F24F 13/14* (2013.01); *B60H 1/12* (2013.01); *F24F 13/10* (2013.01); *F24F 13/24* (2013.01)

(58) Field of Classification Search
CPC ........ B60H 1/00678; B60H 1/00; B60H 1/12; B60H 2001/00721; F24F 13/14; F24F 13/24; F24F 13/10
See application file for complete search history.

(56) References Cited

U.S. PATENT DOCUMENTS

| | | |
|---|---|---|
| 2010/0224253 A1 | 9/2010 | Azar et al. |
| 2011/0319005 A1 | 12/2011 | Sawada et al. |
| 2013/0014912 A1 | 1/2013 | Hara |

FOREIGN PATENT DOCUMENTS

| | | |
|---|---|---|
| DE | 112012002939 T5 | 4/2014 |
| JP | 7-28711 U | 5/1995 |

(Continued)

OTHER PUBLICATIONS

International Search Report for International Application No. PCT/JP2017/043835 dated Mar. 6, 2018.
(Continued)

*Primary Examiner* — Ana M Vazquez
(74) *Attorney, Agent, or Firm* — Birch, Stewart, Kolasch & Birch, LLP (57) ABSTRACT

An air conditioning damper includes a damper main body provided in a casing and closing a flow path formed in the casing by a distal end portion abutting against the inner surface of the casing. The air conditioning damper closes or opens the flow path by pivoting. The air conditioning damper has a cover portion provided on front surface sides or back surface sides of a plurality of protruding portions (Continued)

and extending in the width direction of the damper main body beyond a side surface of the protruding portion.

6 Claims, 6 Drawing Sheets

(51) Int. Cl.
*F24F 13/24* (2006.01)
*B60H 1/12* (2006.01)
*F24F 13/10* (2006.01)

(56) References Cited

FOREIGN PATENT DOCUMENTS

| | | |
|---|---:|---|
| JP | 9-300943 A | 11/1997 |
| JP | 2000-16052 A | 1/2000 |
| JP | 2008-155735 A | 7/2008 |
| JP | 4337179 B2 | 9/2009 |
| JP | 5204298 B2 | 6/2013 |
| JP | 5863303 B2 | 2/2016 |
| JP | 2016-52825 A | 4/2016 |

OTHER PUBLICATIONS

Written Opinion of the International Searching Authority for International Application No. PCT/JP2017/043835, dated Mar. 6, 2018.

AIR CONDITIONING DAMPER, AND AIR CONDITIONING DEVICE FOR VEHICLE

TECHNICAL FIELD

The present invention relates to an air conditioning damper and an air conditioning device for a vehicle.

Priority is claimed on Japanese Patent Application No. 2016-238612, filed on Dec. 8, 2016, the content of which is incorporated herein by reference.

BACKGROUND ART

A vehicular air conditioning device has an air conditioning damper such as an air mix damper, a differential/face damper, and a foot damper and a casing accommodating the air conditioning damper.

It is known in the related art is that air flow into a gap formed when an air conditioning damper is minutely opened results in a vortex street leading to a harsh high frequency sound (sometimes it sounds like "whiz"). Patent Document 1 discloses an example of techniques for limiting such high frequency sounds.

Disclosed in Patent Document 1 is a vehicular air conditioning device including a plurality of projecting portions and an elastic insulator. The projecting portions are provided on a surface of the distal end portion of an air mix damper and have gently tapered side surfaces. The elastic insulator is affixed to the plurality of projecting portions and surfaces of the distal end portions.

In the vehicular air conditioning device, a gap extending in an air flow direction is formed between the elastic insulator and the side surface of the projecting portion. The vehicular air conditioning device is not preferable because air leaks from the gap.

The side surfaces of the plurality of projecting portions are given the tapered shape of gentle inclination so that the elastic insulator can be easily affixed to the side surfaces of the projecting portions.

CITATION LIST

Patent Literature

[Patent Document 1] Japanese Patent No. 5863303

SUMMARY OF INVENTION

Technical Problem

It is preferable that the side surfaces of the projecting portions have a tapered shape of steep, rather than gentle, inclination for enhancement of the effect of high frequency sound suppression.

As for the vehicular air conditioning device disclosed in Patent Document 1, it is difficult to give a tapered shape of steep inclination to the side surfaces of the projecting portions from the viewpoint of air leakage suppression for the reasons described above.

Besides, a temporal change may result in a gap between the elastic insulator and the side surface of the projecting portion even in a case where the side surfaces of the projecting portions have a tapered shape of gentle inclination.

Further, the shape of protrusion that is transferred to the surface of the elastic insulator provided on the projecting portion becomes quite small once an elastic insulator having a small compression reaction force is applied to the vehicular air conditioning device disclosed in Patent Document 1. Then, it may be difficult to obtain a sufficient high frequency sound reduction effect.

An object of the present invention is to provide an air conditioning damper and an air conditioning device for a vehicle allowing enhancement of the effect of high frequency sound reduction.

Solution to Problem

In order to solve the above problems, an air conditioning damper according to an aspect of the present invention, which performs closing and opening on a flow path, includes a damper main body provided in a casing in a pivotable state and having a distal end portion abutting against an inner surface of the casing. The distal end portion of the damper main body has a base material including a surface facing the inner surface of the casing in a state where the flow path is closed, a plurality of protruding portions arranged with respect to a width direction of the damper main body so as to protrude from the surface of the base material, the protruding portion including an upper surface, a pair of side surfaces provided in the width direction of the damper main body and provided between the upper surface and the surface of the base material, and a front surface and a back surface disposed in an orthogonal direction orthogonal to the width direction of the damper main body, an elastic insulator provided so as to conform to shapes of the surface of the base material and the plurality of protruding portions and abutting against the inner surface of the casing, and a cover portion provided on the front surface sides or the back surface sides of the plurality of protruding portions and extending in the width direction of the damper main body beyond the side surface of the protruding portion.

According to the present invention, the cover portion provided on the front surface sides or the back surface sides of the plurality of protruding portions and extending in the width direction of the damper main body beyond the side surface of the protruding portion is provided, and thus an inlet or an outlet of a gap and a part of the cover portion are capable of facing each other when the gap (gap formed in the early stage in which the elastic insulator is affixed to the protruding portion and the base material and gap formed as a result of peeling attributable to a temporal change that the elastic insulator undergoes) is formed between the elastic insulator and the surface of the base material and the side surface of the protruding portion and it is possible to limit air leakage in the orthogonal direction.

As a result, a tapered shape of steep inclination can be given to the side surfaces of the plurality of protruding portions, and thus the effect of high frequency sound reduction can be enhanced with air leakage limited.

By the tapered shape of steep inclination being given to the side surfaces of the plurality of protruding portions, the effect of high frequency sound reduction can be enhanced even in a case where the elastic insulator that has a small compression reaction force is used.

In the air conditioning damper according to an aspect of the present invention, a height of a highest part as one of heights of the cover portion with reference to the surface of the base material may be equal to a height of the upper surface of the protruding portion.

By the height, which exceeds the other heights of the cover portion with reference to the surface of the base material, being equal to the height of the upper surface of the protruding portion as described above, it is possible to limit the cover portion acting as a hindrance when the distal end portion of the damper main body abuts against the inner surface of the casing.

In the air conditioning damper according to an aspect of the present invention, the cover portion may include a pair of side surfaces provided with respect to the width direction of the damper main body and the pair of side surfaces of the cover portion may be more gently inclined than the pair of side surfaces of the protruding portion.

By the pair of side surfaces of the cover portion being inclined surfaces more gently inclined than the pair of side surfaces of the protruding portion as described above, the entire inlet or outlet of the gap formed between the elastic insulator and the surface of the base material and the side surface of the protruding portion and a pair of extending portions of the cover portion are capable of facing each other. As a result, it is possible to limit air leakage in the orthogonal direction.

In the air conditioning damper according to an aspect of the present invention, the pair of side surfaces of the protruding portion and the surface of the base material may form an angle of 90°.

By the angle formed by the surface of the base material and the pair of side surfaces of the protruding portion being 90° as described above, it is possible to maximize the effect of high frequency sound reduction.

In the air conditioning damper according to an aspect of the present invention, the protruding portion may include a plurality of projecting portions arranged in the orthogonal direction in a mutually separated state.

With this configuration, it is possible to reduce the amount of use of the material that constitutes the damper main body and it is possible to reduce the weight of the air conditioning damper.

In the air conditioning damper according to an aspect of the present invention, a thickness of the elastic insulator may exceed a value of a height of the protruding portion.

By the thickness of the elastic insulator exceeding the value of the height of the protruding portion as described above, it is possible to form a plurality of protruding portions including nothing but the elastic insulator at the part of the elastic insulator that is positioned above the upper surfaces of the plurality of protruding portions. As a result, a minute flow path opening can be controlled by means of the elastic deformation of the elastic insulator and without an increase in the operation force at a time of pivoting of the damper main body.

A vehicular air conditioning device according to an aspect of the present invention may include the air conditioning damper, a casing accommodating the air conditioning damper, and an evaporator provided in a front stage of the air conditioning damper in a state of being accommodated in the casing and exchanging heat with air.

The vehicular air conditioning device configured as described above has the air conditioning damper described above, and thus the effect of high frequency sound reduction can be enhanced.

Advantageous Effects of Invention

According to the present invention, the effect of high frequency sound reduction can be enhanced.

DESCRIPTION OF EMBODIMENTS

Hereinafter, an embodiment to which the present invention is applied will be described in detail with reference to accompanying drawings.

Embodiment

Figure 1:
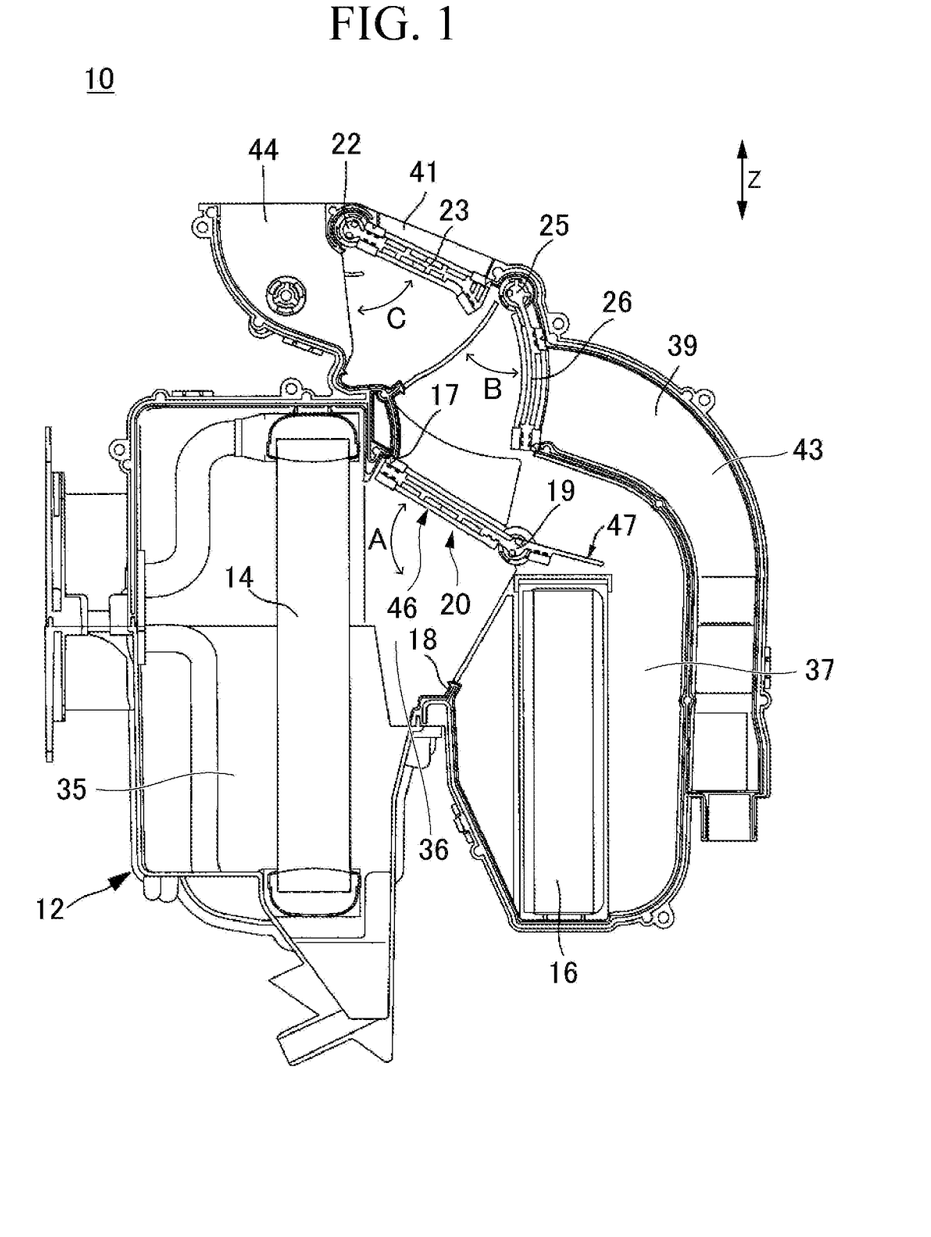
FIG. 1 is a cross-sectional view schematically showing a schematic configuration of a vehicular air conditioning device according to an embodiment of the present invention and schematically showing a state where a heating flow path is fully open by an air mix damper.

A vehicular air conditioning device 10 of the present embodiment will be described with reference to FIG. 1. In FIG. 1, A indicates the direction in which an air mix damper 20 pivots (hereinafter, referred to as "A direction"), B indicates the direction in which a differential/face damper 23 pivots (hereinafter, referred to as "B direction"), C indicates the direction in which a foot damper 26 pivots (hereinafter, referred to as "C direction"), and the Z direction is a vertical direction. In FIG. 1, a heating ventilation and air conditioning unit (HVAC unit) is shown as an example of the vehicular air conditioning device 10. In the present embodiment, a case where the present invention is applied to the air mix damper 20 will be described as an example.

The vehicular air conditioning device 10 of the present embodiment has a casing 12, an evaporator 14, a heater 16, a first seal portion 17, a second seal portion 18, rotary shafts 19, 22, and 25, the air mix damper 20 as an air conditioning damper, the differential/face damper 23, and the foot damper 26.

The casing 12 accommodates the evaporator 14, the heater 16, the first seal portion 17, the second seal portion 18, the rotary shafts 19, 22, and 25, the air mix damper 20, the differential/face damper 23, and the foot damper 26. Partitioned inside the casing 12 are an air flow path 35, a bypass flow path 36, a heating flow path 37, an air mix region 39, a face blowout flow path 41, a foot blowout flow path 43, and a differential blowout flow path 44.

The air flow path 35 is disposed on the inlet side of the casing 12. The air flow path 35 is a flow path guiding the air that is blown from a blower unit (not shown) to the evaporator 14, and the air flows through the air flow path 35 after heat exchange at the evaporator 14. The air flow path 35 branches into the bypass flow path 36 and the heating flow path 37 on the downstream side of the air flow path 35.

The downstream sides of the bypass flow path 36 and the heating flow path 37 are in communication with the air mix region 39. The air that flows through the bypass flow path 36 flows to the air mix region 39 without passing through the heater 16. The air that flows through the heating flow path 37 flows to the air mix region 39 after being heated by the heater 16.

In the air mix region 39, a desired air temperature is reached by the air that has bypassed the heater 16 and the air that has been heated by the heater 16 being mixed with each other.

The downstream side of the air mix region 39 is in communication with the face blowout flow path 41, the foot blowout flow path 43, and the differential blowout flow path 44.

The face blowout flow path 41 supplies cold air or warm air to a face blowout port (not shown) provided in a vehicle.

The foot blowout flow path 43 supplies cold air or warm air to a foot blowout port (not shown) provided in the vehicle. The differential blowout flow path 44 supplies cold air or warm air to a differential blowout port (not shown) provided in the vehicle.

A resinous unit case or the like can be used as the casing 12 configured as described above.

The air flow path 35 in the casing 12 is provided with the evaporator 14. A refrigerant flows in the evaporator 14. The evaporator 14 causes the air that is supplied from the left side of FIG. 1 and the refrigerant to exchange heat with each other. As a result, the evaporator 14 reduces the temperature of the air and generates cold air.

The heating flow path 37 is provided with the heater 16. Warm water flows in the heater 16. The heater 16 causes the air that passes through the heater 16 and the warm water to exchange heat with each other. As a result, the heater 16 heats the air.

The first and second seal portions 17 and 18 are accommodated in the casing 12 that is positioned between the evaporator 14 and the heater 16. The first seal portion 17 is provided on the inner surface of the upper portion of the casing 12. The second seal portion 18 is provided on the inner surface of the lower portion of the casing 12.

In a case where the heating flow path 37 is fully opened, one surface side of a distal end portion 46A of a damper main body 46 constituting the air mix damper 20 abuts against the first seal portion 17. In a case where the heating flow path 37 is fully closed, the other surface side of the distal end portion 46A of the damper main body 46 constituting the air mix damper 20 abuts against the second seal portion 18.

Figure 2:
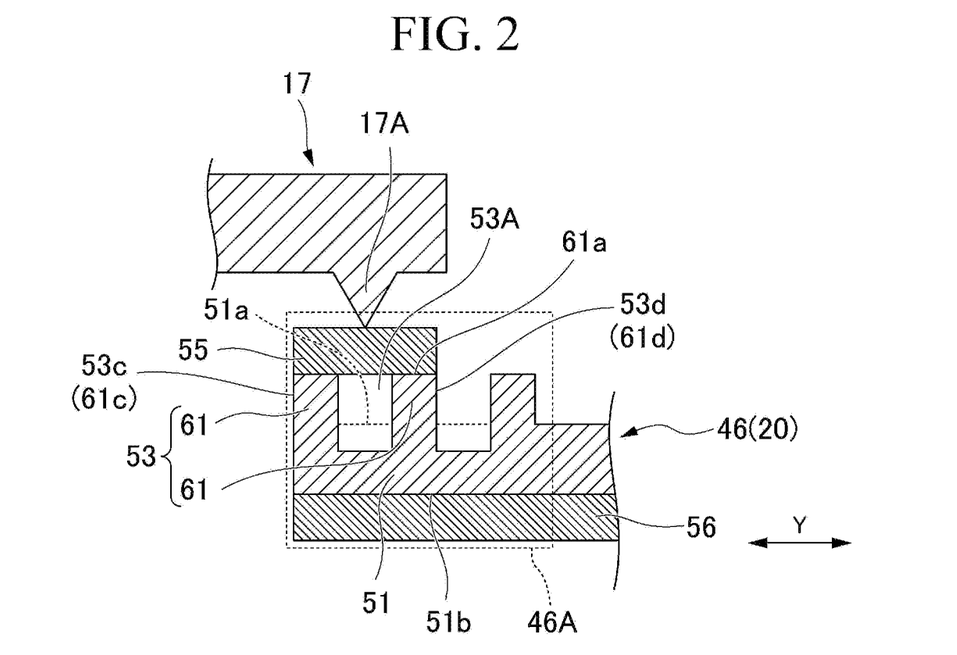
FIG. 2 is a cross-sectional view of the distal end portion and a first seal portion of the damper main body that is shown in FIG. 1.
Figure 3:
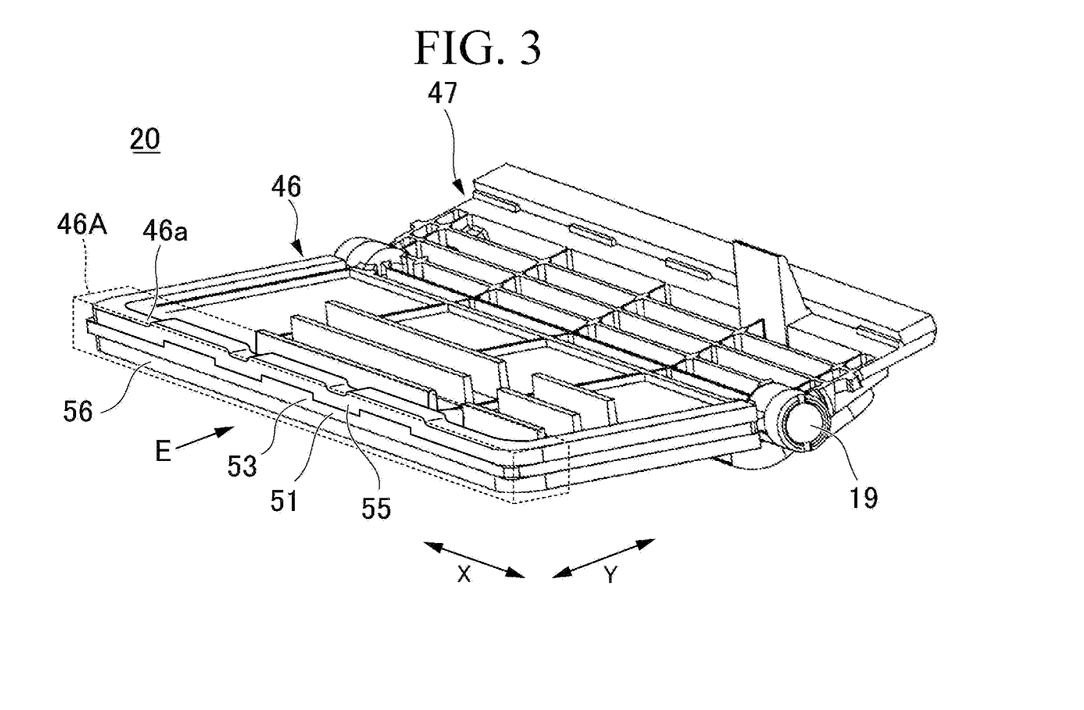
FIG. 3 is a perspective view of the air mix damper that is shown in FIG. 1.
Figure 4:
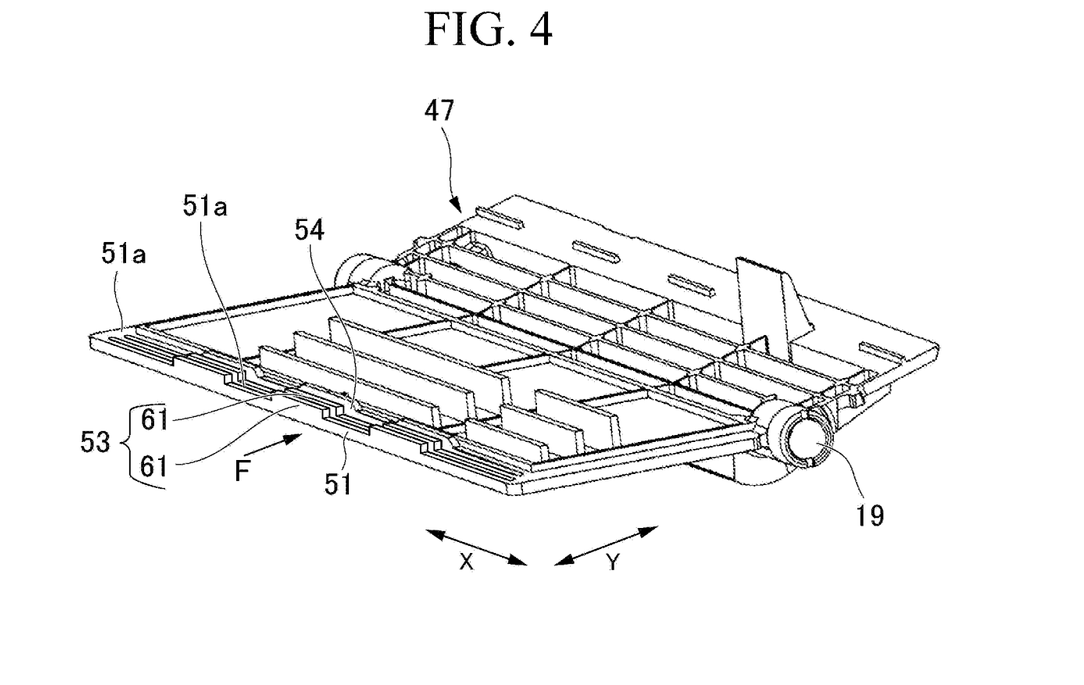
FIG. 4 is a perspective view of a structure in which an elastic insulator has been removed from the air mix damper that is shown in FIG. 3.

The configuration of the first seal portion 17 will be described with reference to FIGS. 2 to 4. In FIG. 2, the same component parts as those of the structure shown in FIG. 1 are denoted by the same reference numerals. In FIG. 3, the X direction is the width direction of the damper main body 46 and the Y direction is the orthogonal direction that is orthogonal to the X direction. In FIG. 3, the same component parts as those of the structures shown in FIGS. 1 and 2 are denoted by the same reference numerals. In FIG. 4, the same component parts as those of the structures shown in FIGS. 1 to 3 are denoted by the same reference numerals.

The first seal portion 17 has an insertion projection portion 17A. The insertion projection portion 17A protrudes to a surface 51a side of a base material 51 constituting the damper main body 46. The insertion projection portion 17A is shaped so as to be insertable into a recess portion 53A of a protruding portion 53 (described later) across an elastic insulator 55.

By providing the first seal portion 17 configured as described above, it is possible to enhance wind shielding properties when the surface 51a side of the base material 51 constituting the damper main body 46 abuts against the first seal portion 17.

The rotary shaft 19 is provided in the casing 12. The rotary shaft 19 is disposed between the bypass flow path 36 and the heating flow path 37. The rotary shaft 19 supports the air mix damper 20 in a state of being pivotable in the A direction.

Figure 5:
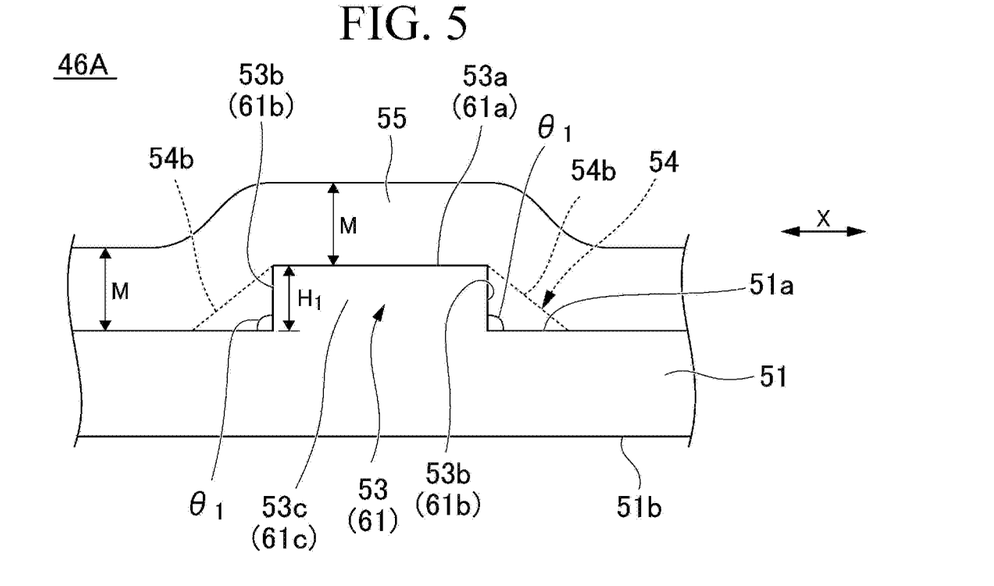
FIG. 5 is an E view of the distal end portion of the damper main body that is shown in FIG. 3.
Figure 6:
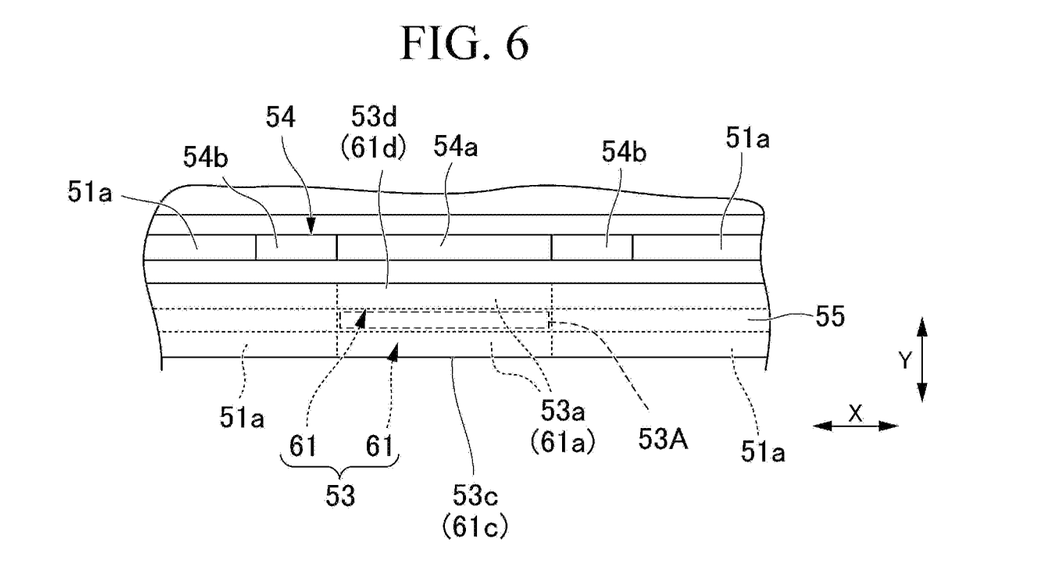
FIG. 6 is a plan view of the air mix damper that is shown in FIG. 3.
Figure 7:
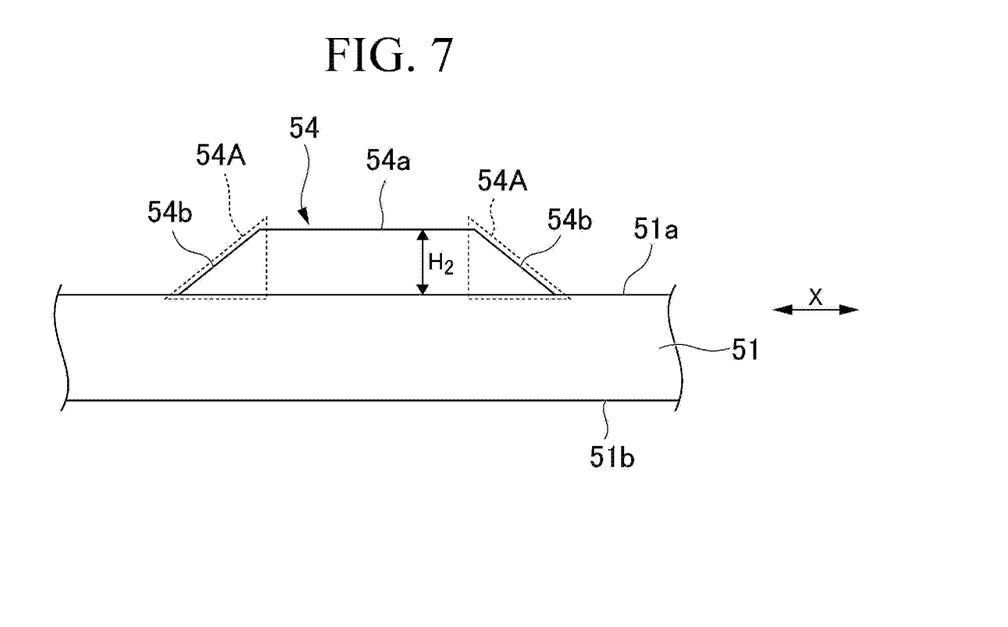
FIG. 7 is an F view of the cover portion that is shown in FIG. 4.

Next, the air mix damper 20 will be described with reference to FIGS. 1 to 7. In FIG. 5, $H_1$ indicates the height of the protruding portion 53 (a projecting portion 61) with reference to the surface 51a of the base material 51 (hereinafter, referred to as "height $H_1$") and M indicates the thickness of the elastic insulator 55 (hereinafter, referred to as "thickness M"). In FIG. 7, $H_2$ indicates the height of a cover portion 54 with reference to the surface 51a of the base material 51 (hereinafter, referred to as "height $H_2$"). In FIGS. 5 to 7, the same component parts as those of the structures shown in FIGS. 1 to 4 are denoted by the same reference numerals.

The air mix damper 20 is accommodated in the casing 12. The air mix damper 20 is supported by the rotary shaft 19 in a state of being pivotable in the A direction.

The air mix damper 20 has the damper main body 46 and a sub damper 47. The damper main body 46 has the base material 51, the protruding portion 53, the cover portion 54, the elastic insulator 55, and an elastic insulator 56. The damper main body 46 has the distal end portion 46A abutting against the first and second seal portions 17 and 18. The base material 51, the protruding portion 53, the cover portion 54, and the elastic insulators 55 and 56 constitute the distal end portion 46A.

The base material 51 is a rectangular plate-shaped member extending in the X direction and the Y direction. The base material 51 has the surface 51a and the other surface 51b. The surface 51a is on the side that faces the first seal portion 17. The elastic insulator 55 is affixed to the surface 51a. The other surface 51b disposed on the side that is opposite to the surface 51a. The elastic insulator 56 is affixed to the other surface 51b.

A plurality of the protruding portions 53 are arranged with respect to the X direction so as to protrude from the surface 51a of the base material 51. The protruding portion 53 includes a plurality of (two in the case of the present embodiment as an example) the projecting portions 61 arranged in the Y direction in a mutually separated state and the recess portion 53A disposed between the plurality of projecting portions 61.

By the plurality of projecting portions 61 arranged in the Y direction in a mutually separated state constituting the protruding portion 53 as described above, it is possible to reduce the amount of use of the material that constitutes the damper main body 46 and it is possible to reduce the weight of the air mix damper 20.

The projecting portion 61 protrudes from the surface 51a of the base material 51. The projecting portion 61 has an upper surface 61a, a pair of side surfaces 61b, a front surface 61c, and a back surface 61d.

The upper surface 61a is a flat surface. The upper surface 61a constitutes an upper surface 53a of the protruding portion 53.

The pair of side surfaces 61b is disposed between the upper surface 61a and the surface 51a of the base material 51. The pair of side surfaces 61b is disposed in the X direction. The pair of side surfaces 61b constitutes a pair of side surfaces 53b of the protruding portion 53. The elastic insulator 55 is affixed to the upper surfaces 61a and the pair of side surfaces 61b of the plurality of projecting portions 61.

The front surface 61c and the back surface 61d are disposed in the Y direction. The front surface 61c is on the side where air flows in after passage through the evaporator 14. The back surface 61d is disposed on the side that is opposite to the front surface 61c.

The front surface 61c of the projecting portion 61 that is disposed in the foremost row (first row in the case of the present embodiment) among the plurality of projecting portions 61 constitutes a front surface 53c of the protruding portion 53. The back surface 61d of the projecting portion 61 that is disposed in the rearmost row (second row in the case of the present embodiment) among the plurality of projecting portions 61 constitutes a back surface 53d of the protruding portion 53.

It is preferable that an angle θ1 formed by the surface 51a of the base material 51 and the pair of side surfaces 53b of the protruding portion 53 configured as described above is, for example, 90°. By the angle θ1 formed by the surface 51a of the base material 51 and the pair of side surfaces 53b of the protruding portion 53 being 90° as described above, it is possible to maximize the effect of high frequency sound reduction.

Although it is preferable that the angle $\theta_1$ is as close as possible to 90°, it is possible to enhance the effect of high frequency sound reduction insofar as the pair of side surfaces 53b is more steeply inclined than in the related art.

The recess portion 53A is partitioned between the two projecting portions 61 arranged in the Y direction. The recess portion 53A has a shape that allows insertion of the insertion projection portion 17A shown in FIG. 2.

The cover portion 54 is provided on each of the back surface 53d sides of the plurality of protruding portions 53 such that a part of the cover portion 54 faces the back surface 53d of the protruding portion 53. The cover portion 54 protrudes from the surface 51a of the base material 51 and extends in the X direction beyond the side surface 53b of the protruding portion 53.

The cover portion 54 has a pair of extending portions 54A extending in the X direction beyond the side surfaces 53b of the protruding portion 53. The pair of extending portions 54A is provided at positions capable of facing the entire outlet of a gap when the gap (hereinafter, referred to as "gap G") extending in the Y direction is formed between the elastic insulator 55 and the side surface 53b of the protruding portion 53 and the surface 51a of the base material 51 (gap formed in the early stage in which the elastic insulator 55 is affixed to the protruding portion 53 and gap formed after the elapse of a long time from affixing of the elastic insulator 55 to the protruding portion 53).

In a case where the cover portion 54 has a trapezoidal shape in an F view, the shape of the extending portion 54A can be, for example, triangular (see FIG. 7). Although a case exemplifying a case where the extending portion MA has a triangular shape is exemplified as an example in FIG. 7, the shape of the extending portion MA is not limited to the triangular shape and may be any shape insofar as it is possible to face the entire gap G in the Y direction.

The cover portion 54 has an upper surface 54a and a pair of side surfaces 54b provided on the pair of extending portions 54A. The upper surface 54a is flat. The pair of side surfaces 54b is disposed in the X direction. The pair of side surfaces 54b is inclined surfaces more gently inclined than the pair of side surfaces 53b of the protruding portion 53.

By the pair of side surfaces 54b of the cover portion 54 being inclined surfaces more gently inclined than the pair of side surfaces 53b of the protruding portion 53 as described above, the entire outlet side of the gap G formed between the elastic insulator 55 and the surface 51a of the base material 51 and the side surface 53b of the protruding portion 53 and the pair of extending portions 54A of the cover portion 54 are capable of facing each other. As a result, it is possible to limit air leakage in the Y direction.

The height $H_2$ of the highest part, which is one of the heights of the cover portion 54 with reference to the surface 51a of the base material 51, may be equal to the height of the upper surface of the protruding portion.

By the height $H_2$, which exceeds the other heights of the cover portion 54 with reference to the surface 51a of the base material 51, being equal to the height $H_1$ of the upper surface 53a of the protruding portion 53 as described above, it is possible to limit the cover portion 54 acting as a hindrance when the distal end portion 46A of the damper main body 46 abuts against the inner surface of the casing 12 via the first seal portion 17.

The elastic insulator 55 is affixed to the surface 51a of the base material 51 and the upper surfaces 53a and the side surfaces 53b of the plurality of protruding portions 53 so as to conform to the shapes of the surface 51a of the base material 51 and the upper surfaces 53a and the side surfaces 53b of the plurality of protruding portions 53.

The cover portion 54 is not provided with the elastic insulator 55. In other words, the cover portion 54 is exposed from the elastic insulator 55. The elastic insulator 55 is a member abutting against the first seal portion 17.

The thickness M of the elastic insulator 55 may exceed, for example, the value of the height $H_1$ of the protruding portion 53.

By the thickness M of the elastic insulator 55 exceeding the value of the height of the protruding portion 53 as described above, it is possible to form a plurality of protruding portions including nothing but the elastic insulator 55 at the part of the elastic insulator 55 that is positioned above the upper surfaces 53a of the plurality of protruding portions 53. As a result, a minute flow path opening can be controlled by means of the elastic deformation of the elastic insulator 55 and without an increase in the operation force at a time of pivoting of the damper main body 46.

An elastic insulator having a small compression reaction force or the like may be used as the elastic insulator 55. Examples of the material of the elastic insulator 55 include an EPDM foam and a polyurethane foam.

The elastic insulator 56 is affixed to the other surface 51b of the base material 51. The elastic insulator 56 is a member abutting against the second seal portion 18. An elastic insulator identical to the elastic insulator 55 or the like can be used as the elastic insulator 56.

In the air mix damper 20 configured as described above, the range of temperature fluctuation becomes extremely wide with respect to a slight rotation angle of the air mix damper 20 near the maximum heating position. Accordingly, subtle opening degree adjustment is required for the air mix damper 20. Air flows into the gap G described above when the air mix damper 20 is controlled to a minute opening degree position of slight opening from the maximum heating position.

The rotary shaft 22 is provided in the casing 12 that is positioned between the face blowout flow path 41 and the differential blowout flow path 44. The rotary shaft 22 supports the differential/face damper 23 in a state where the differential/face damper 23 is pivotable in the C direction.

The differential/face damper 23 pivots between the position at which the face blowout flow path 41 is fully closed and the position at which the differential blowout flow path 44 is fully closed.

The rotary shaft 25 is provided in the casing 12 that is positioned between the air mix region 39 and the foot blowout flow path 43. The rotary shaft 25 supports the foot damper 26 in a state where the foot damper 26 is pivotable in the B direction.

The foot damper 26 pivots between the position at which the flow path communicating with the face blowout flow path 41 and the differential blowout flow path 44 is fully closed and the position at which the foot blowout flow path 43 is fully closed.

In this configuration, the mode in which temperature-controlled air is blown out into a vehicle cabin is switchable between five blowout modes as a result of opening and closing of the differential/face damper 23 and the foot damper 26 described above. The five blowout modes are a face mode of blowout from the face blowout flow path 41, a bi-level mode of blowout from the face blowout flow path 41 and the foot blowout flow path 43, a foot mode of blowout from the foot blowout flow path 43, a differential/foot mode of blowout from the foot blowout flow path 43 and the differential blowout flow path 44, and a differential mode of blowout from the differential blowout flow path 44.

In the vehicular air conditioning device 10 configured as described above, the air flow that has been sent into the air flow path 35 exchanges heat with the refrigerant in the process of passing through the evaporator 14 and is cooled. The cooled air is divided into the bypass flow path 36 side and the heating flow path 37 in accordance with the flow rate ratio that is adjusted by the air mix damper 20. The air that has been circulated to the heating flow path 37 side is heated as a result of heat exchange with the warm water in the heater 16 during passage through the heater 16.

In the air mix region 39 disposed downstream of the air mix damper 20, the air is mixed with the cold air that has bypassed the heater 16. As a result, the temperature of the air is adjusted to a set temperature and the air becomes the temperature-controlled air.

The temperature-controlled air is selectively blown out into the vehicle cabin from at least one of the face blowout flow path 41, the foot blowout flow path 43, and the differential blowout flow path 44 in accordance with the blowout mode such as the face mode, the foot mode, the differential mode, the differential foot mode, and the bi-level mode, which is switched as a result of opening and closing of the differential/face damper 23 and the foot damper 26 for blowout mode switching. In this manner, the temperature-controlled air is used for air conditioning in the vehicle cabin.

The vehicular air conditioning device 10 according to the present embodiment has the cover portion 54 provided on the front surface 53c sides or the back surface 53d sides of the plurality of protruding portions 53 and extending in the X direction beyond the side surface 53b of the protruding portion 53. Accordingly, the outlet of the gap G and a part (the extending portion 54A) of the cover portion 54 are capable of facing each other when the gap G (gap G formed in the early stage in which the elastic insulator 55 is affixed to the protruding portion 53 and the base material 51 and gap G formed as a result of peeling attributable to a temporal change that the elastic insulator 55 undergoes) is formed between the elastic insulator 55 and the surface 51a of the base material 51 and the side surface 53b of the protruding portion 53 and it is possible to limit air leakage in the Y direction.

As a result, a tapered shape of steep inclination can be given to the side surfaces 53b of the plurality of protruding portions 53, and thus the effect of high frequency sound reduction can be enhanced with air leakage limited.

By the tapered shape of steep inclination being given to the side surfaces 53b of the plurality of protruding portions 53, the effect of high frequency sound reduction can be enhanced even in a case where the elastic insulator 55 that has a small compression reaction force is used.

In the present embodiment, the air mix damper 20 has been described as an example of the air conditioning damper of the present embodiment. Alternatively, the differential/face damper 23 and the foot damper 26 as air conditioning dampers may be provided with a plurality of the cover portions 54. Also in this case, effects similar to those of the air mix damper 20 described in the present embodiment can be obtained.

Figure 8:
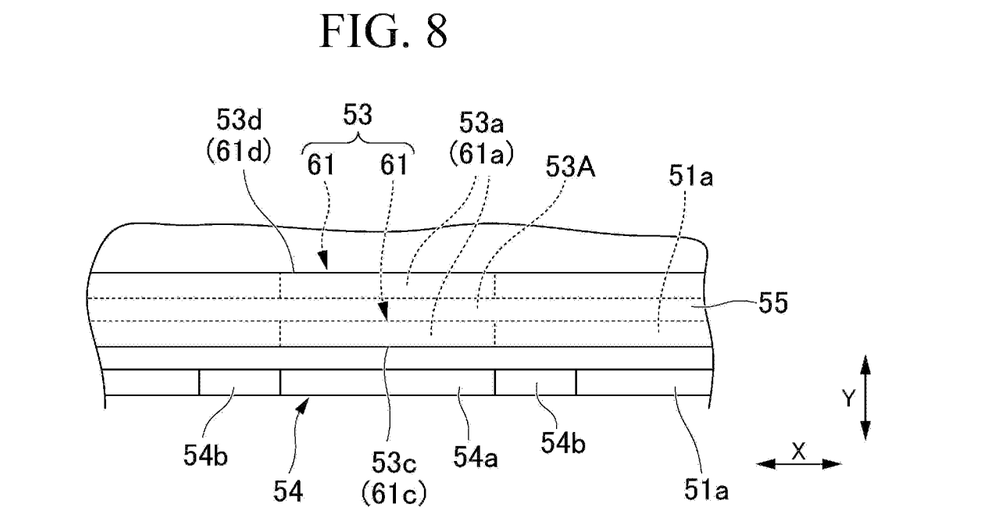
FIG. 8 is a plan view showing another example of the mix damper.

In the present embodiment, a case where the cover portion 54 is provided on the back surface 53d sides of the plurality of the protruding portions 53 has been described as an example. Alternatively, the cover portion 54 may be provided on the front surface 53c sides of the plurality of the protruding portions 53 as shown in FIG. 8. In this case, it is possible to cause the cover portion 54 and the inlet of the gap G to face each other, and thus effects similar to those of the air conditioning damper of the present embodiment can be obtained.

In FIG. 8, the same component parts as those of the structure shown in FIG. 6 are denoted by the same reference numerals.

Figure 9:
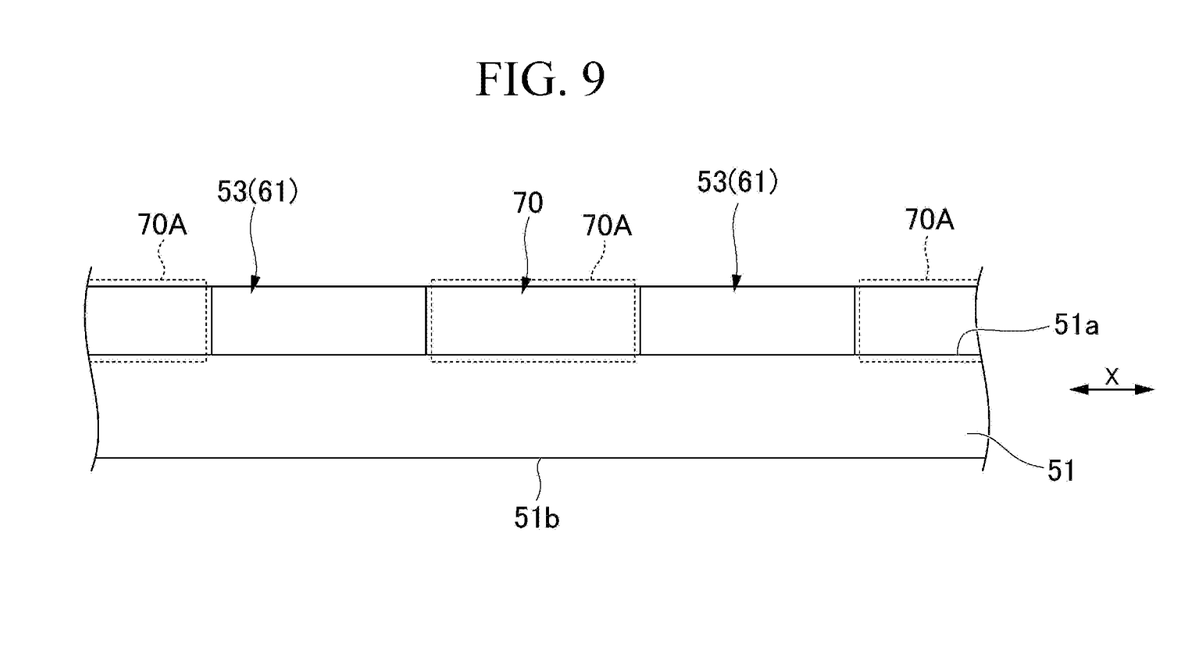
FIG. 9 is a diagram showing a modification example of the cover portion.

A cover portion 70 according to a modification example of the present embodiment will be described with reference to FIG. 9. In FIG. 9, the same component parts as those of the structure shown in FIG. 5 are denoted by the same reference numerals. The elastic insulator 55 is not shown in FIG. 9.

The cover portion 70 is a plate-shaped member facing the plurality of protruding portions 53. The cover portion 70 has an extending portion 70A disposed between the adjacent protruding portions 53 arranged in the X direction. The extending portion 70A is rectangular.

By providing the cover portion 70 configured as described above, it is possible to obtain effects similar to those of the cover portion 54 described above.

Although a preferred embodiment of the present invention has been described in detail above, the present invention is not limited to the specific embodiment and various modifications and changes are possible within the scope of the present invention as set forth in the claims.

INDUSTRIAL APPLICABILITY

The present invention is applicable to air conditioning dampers and vehicular air conditioning devices.

REFERENCE SIGNS LIST

10 Vehicular air conditioning device
12 Casing
14 Evaporator
16 Heater
17 First seal portion
17A Insertion projection portion
18 Second seal portion 19, 22, 25 Rotary shaft
20 Air mix damper
23 Differential/face damper
26 Foot damper
35 Air flow path
36 Bypass flow path
37 Heating flow path
39 Air mix region
41 Face blowout flow path
43 Foot blowout flow path
44 Differential blowout flow path
46 Damper main body
46A Distal end portion
47 Sub damper
51 Base material
51a Surface
51b The other surface
53 Protruding portion
53a, 54a, 61a Upper surface
53A Recess portion
53b, 54b, 61b Side surface
53c, 61c Front surface
53d, 61d Back surface
54, 70 Cover portion
54A, 70A Extending portion
55, 56 Elastic insulator
61 Projecting portion
A to C Direction
$H_1$, $H_2$ Height
M Thickness
$\theta_1$ Angle

What is claimed is:

1. An air conditioning damper performing closing and opening on a flow path, the air conditioning damper comprising:
    a damper main body provided in a casing in a pivotable state and having a distal end portion abutting against an inner surface of the casing, wherein
    the distal end portion of the damper main body has:
        a base material including a surface facing the inner surface of the casing in a state where the flow path is closed;
        a plurality of protruding portions arranged with respect to a width direction of the damper main body so as to protrude from the surface of the base material, the protruding portion including an upper surface, a pair of side surfaces provided in the width direction of the damper main body and provided between the upper surface and the surface of the base material, and a front surface and a back surface disposed in an orthogonal direction orthogonal to the width direction of the damper main body;
        an elastic insulator provided so as to conform to shapes of the surface of the base material and the plurality of protruding portions and abutting against the inner surface of the casing; and
        a cover portion provided on the front surface sides or the back surface sides of the plurality of protruding portions and extending in the width direction of the damper main body beyond the side surface of the protruding portion,
    the cover portion is provided with respect to each of the plurality of protruding portions,
    a gap with respect to the elastic insulator is formed between the elastic insulator and the surface of the base material and the side surface of the protruding portion,
    the cover portion includes a pair of side surfaces provided with respect to the width direction of the damper main body, and
    the pair of side surfaces of the cover portion is inclined surfaces, an angle between the pair of side surfaces of the cover portion and the surface of the base material is smaller than an angle between the pair of side surfaces of the protruding portion and the surface of the base material.

2. The air conditioning damper according to claim 1, wherein a height of a highest part as one of heights of the cover portion with reference to the surface of the base material is equal to a height of the upper surface of the protruding portion.

3. The air conditioning damper according to claim 1, wherein the pair of side surfaces of the protruding portion and the surface of the base material form the angle of 90°.

4. The air conditioning damper according to claim 1, wherein the protruding portion includes a plurality of projecting portions arranged in the orthogonal direction in a mutually separated state.

5. The air conditioning damper according to claim 1, wherein a thickness of the elastic insulator exceeds a value of a height of the protruding portion.

6. A vehicular air conditioning device comprising:
    an air conditioning damper according to claim 1;
    a casing accommodating the air conditioning damper; and
    an evaporator provided in a front stage of the air conditioning damper in a state of being accommodated in the casing and exchanging heat with air.

* * * * *